UNITED STATES PATENT OFFICE.

MAX ULRICH SCHOOP, OF BOIS-COLOMBES, FRANCE.

WELDING COMPOUND.

943,164.  Specification of Letters Patent.  Patented Dec. 14, 1909.

No Drawing.  Application filed June 18, 1908.  Serial No. 439,245.

*To all whom it may concern:*

Be it known that I, MAX ULRICH SCHOOP, a citizen of the Republic of Switzerland, residing at Bois-Colombes, (Seine,) France, have invented certain new and useful Improvements in Welding Compounds; and I do hereby declare the following to be a full, clear, and exact description of the invention, such as will enable others skilled in the art to which it appertains to make and use the same.

In welding aluminum by the use of welding compounds containing chlorid combinations of the alkali metals, it has been found that the surface of the parts at or adjacent the weld are not bright and have a dross-like appearance and sometimes a perfect weld is not attained. In numerous cases in practice, for example sheets and tubes in which the weld is formed are to be subjected to subsequent mechanical operations such as forging or rolling. These dull surfaces at the weld become incorporated or driven into the body of the metal whereby the physical characteristics and appearances of these articles are not beneficially influenced. In the present invention I seek to overcome these difficulties. In all soldering or welding processes it is necessary to maintain the metal surface as clean as possible, i. e., free from grease, oxidation, and other impurities. The various fluxes such as borax, for example, reduce or dissolve the oxid coatings and simultaneously protect the surface from the action of air or flame and in my copending application for Patent No. 359,070, filed February 25, 1907, I have described fluxes which produce similar results in order to maintain a chemically clean aluminum surface during the welding and thereby permit the melted surfaces to be welded to properly unite.

Extensive experiments have shown that the cleaning or dissolving action of the substances mentioned in said application, to wit, alkali chlorids, and potassium bisulfate may be greatly enhanced by the addition of quantities of fluorids and those fluorids with which I have had experience are the alkaline fluorids, embracing the fluorids of the metals of the alkalies and fluorids of the metals of the alkaline earths. I have also used fluorids of earthy metals, of which the double fluorid of sodium and aluminum known as cryolith $Na_3AlFl_6$ is a type, boron fluorid and others. As an example of such a welding compound I may use a mixture of potassium chlorid, lithium chlorid, sodium chlorid and fluor-spar or other fluorid as a welding compound and as substitutes or equivalents for the alkali metal chlorids, I may use other haloid salts of these metals such as bromids and iodids, potassium chlorid 60 grams, sodium chlorid 12 grams, lithium chlorid, 20 grams, cryolith 6 grams.

In order to render the compound convenient for use the substances are melted together and the melted mass cooled and made fine or ground to powder thereby destroying any crystalline structure. The powder is then sifted and mixed to a thick paste with a suitable vehicle as an aqueous solution of glycerin, containing five to ten per cent. glycerin.

In lieu of making a fused mixture of the salts, each salt may be separately fused and ground. The glycerin prevents any of the salts from crystallizing out of the paste. Certain oils may be used in place of glycerin, of which paraffin oil and petroleum are examples. Whatever the vehicle used it must preserve the consistency and uniformity of the paste.

The proportions of the constituents of the welding compound are so chosen that the compound fuses at a temperature close to that of the melting point of aluminum, either slightly above or below.

By the use of the above described welding compound an absolutely homogeneous welding together of the parts to be welded is obtained throughout the whole length of the weld and without producing darkened or unclean looking surfaces at the weld. The above described compound can be advantageously used as a flux for melting together aluminum scrap, as wire sheets and the like, thereby preventing the usual losses due to the oxidation that is usually set up when melting together such scrap, the loss being in the neighborhood of 50% in the present methods.

I claim:—

1. A compound for welding aluminum, comprising a mixture of haloid salts of alkaline metals one of which is a fluorid and glycerin, said mixture melting at substantially the melting point of aluminum.

2. A welding compound for aluminum, comprising haloid salts fused to form a compound whose melting point is substantially the melting point of aluminum, said compound ground and mixed to a paste with an aqueous solution of glycerin.

In testimony that I claim the foregoing as my invention, I have signed my name in presence of two subscribing witnesses.

MAX ULRICH SCHOOP.

Witnesses:
C. ROTHMUND,
JOSEPH SIMON.